United States Patent
Tanaka

(10) Patent No.: US 9,145,042 B2
(45) Date of Patent: Sep. 29, 2015

(54) AIR CONDITIONING APPARATUS FOR A VEHICLE

(75) Inventor: Toshiyuki Tanaka, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 138 days.

(21) Appl. No.: 13/640,799

(22) PCT Filed: Apr. 26, 2010

(86) PCT No.: PCT/JP2010/057381
§ 371 (c)(1),
(2), (4) Date: Oct. 12, 2012

(87) PCT Pub. No.: WO2011/135654
PCT Pub. Date: Nov. 3, 2011

(65) Prior Publication Data
US 2013/0031925 A1   Feb. 7, 2013

(51) Int. Cl.
*F25D 17/04*  (2006.01)
*F25B 41/04*  (2006.01)
(Continued)

(52) U.S. Cl.
CPC .......... *B60H 1/3229* (2013.01); *B60H 1/00485* (2013.01); *B60H 1/00521* (2013.01); *F25B 41/062* (2013.01); *F25B 2341/0683* (2013.01)

(58) Field of Classification Search
CPC F25B 41/062; B60H 1/3229; B60H 1/00521; B60H 1/00485; B60H 1/0055; B60H 1/00585
USPC .............. 62/299, 77, 298, 224, 225; 137/524, 137/315.41; 236/92 B
See application file for complete search history.

(56) References Cited

U.S. PATENT DOCUMENTS 3,260,544 A * 7/1966 Hathaway, Jr. ................. 74/548
4,589,263 A * 5/1986 DiCarlo et al. ................. 62/193
(Continued)

FOREIGN PATENT DOCUMENTS

CN      1445471     10/2003
JP     59-140909     9/1984
(Continued)

OTHER PUBLICATIONS

English Translation of Applicant's Reply to the Written Opinion of the International Searching Authority in International Application No. PCT/JP2010/057381 (Notification Date: Jun. 1, 2010).
(Continued)

*Primary Examiner* — Cassey D Bauer
(74) *Attorney, Agent, or Firm* — Finnegan, Henderson, Farabow, Garrett & Dunner, LLP

(57) ABSTRACT

Different kinds of air conditioning apparatus may be easily produced in accordance with specifications, even in a vehicle assembly factory, and costs of transport and administration of air conditioning units, storage space in the vehicle assembly factory and suchlike may be reduced. The air conditioning apparatus includes an expansion valve with a pressure adjustment screw and an air conditioning unit. A mounting space to which the expansion valve is mounted is provided at a unit case of the air conditioning unit, and an opening portion is formed in a wall portion around the mounting space. The opening portion is for insertion of a tool that turns the pressure adjustment screw. A setting of pressure of the expansion valve is carried out by the tool being inserted through the opening portion around the mounting space of the expansion valve and turning the pressure adjustment screw of the expansion valve.

2 Claims, 3 Drawing Sheets

(51) Int. Cl.
*F25B 41/06* (2006.01)
*G05D 23/12* (2006.01)
*F25D 19/00* (2006.01)
*B60H 1/32* (2006.01)
*B60H 1/00* (2006.01)

(56) References Cited

U.S. PATENT DOCUMENTS

| | | | | |
|---|---|---|---|---|
| 4,901,978 | A | * | 2/1990 | Feild .............................. 251/282 |
| 5,555,739 | A | | 9/1996 | Kujirai et al. |
| 5,724,817 | A | * | 3/1998 | Nishishita ........................ 62/216 |
| 7,624,930 | B2 | * | 12/2009 | Honda et al. ................. 236/92 B |
| 2002/0023462 | A1 | * | 2/2002 | Kato et al. ....................... 62/527 |
| 2003/0172668 | A1 | | 9/2003 | Minowa et al. |
| 2007/0062208 | A1 | * | 3/2007 | Toba ................................ 62/239 |
| 2008/0073441 | A1 | * | 3/2008 | Honda et al. ................. 236/92 B |

FOREIGN PATENT DOCUMENTS

| | | |
|---|---|---|
| JP | 62-27449 | 7/1987 |
| JP | 7-37729 | 7/1995 |
| JP | 11-325661 | 11/1999 |
| JP | 2000-304381 | 11/2000 |
| JP | 2003-90647 | 3/2003 |
| JP | 2003-269823 | 9/2003 |
| JP | 2007283970 A * | 11/2007 |

OTHER PUBLICATIONS

First Office Action for Chinese Appl. No. 201080066403.6 dated Mar. 5, 2014.

* cited by examiner

AIR CONDITIONING APPARATUS FOR A VEHICLE

CROSS-REFERENCE TO RELATED APPLICATIONS

This application is a national phase application of International Application No. PCT/JP2010/057381, filed Apr. 26, 2010, the content of which is incorporated herein by reference.

TECHNICAL FIELD

The present invention relates to an air conditioning apparatus for a vehicle.

BACKGROUND ART

An expansion valve for allowing a refrigerant to expand, which is used in an air conditioning apparatus or the like, has been disclosed (see Patent Document 1). in this expansion valve, a level of opening of a valve body for controlling flow volumes of the refrigerant is set by a pressure force of a spring. An adjustment screw for adjusting the pressure force of the spring (a pressure setting value) is provided at a lower end portion of a valve main body.

RELATED ART DOCUMENTS

Patent Documents

Patent Document 1: Japanese Patent Application Laid-Open (JP-A) No. H11-325661

SUMMARY OF INVENTION

Technical Problem

An optimum value of the pressure setting value of the expansion valve varies depending on differences in specifications of air-conditioning apparatuses. Therefore, the pressure setting value is altered in accordance with respective specifications. The assignment of installation space in an engine compartment is severely constrained, and it is advantageous in regard to the performance of an air conditioning apparatus if an installation position of the expansion valve is in the vicinity of a cabin interior heat exchanger (an evaporator). Currently therefore, the expansion valve is almost always mounted in an air conditioning unit in an air conditioning apparatus production factory and shipped with the pressure having been set beforehand, and it is not possible to change the setting value after mounting.

An operation of mounting an expansion valve to an air conditioning unit requires precise torque adjustment, the use of a special tool, and a guarantee of mounting quality. Therefore, it is not practical to perform this operation in a vehicle assembly factory.

Consequently, because the number of types of air conditioning unit is increasing, costs of administration of the different types in an air conditioning unit production factory and transport costs and the like are increasing. Moreover, it is necessary to reserve storage space for each type of air conditioning unit in a vehicle assembly factory.

In consideration of the situation described above, an object of the present invention is to enable easy production of different kinds of air conditioning apparatus in accordance with specifications thereof, even in a vehicle assembly factory rather than just an air conditioning apparatus production factory, and to enable reductions in costs of transport and administration of air conditioning units and in storage space in the vehicle assembly factory.

Solution To Problem

A first aspect of the present invention comprises an expansion valve with a pressure adjustment screw; and an air conditioning unit in which a mounting space at which the expansion valve is mounted is provided at a unit case, and an opening portion for insertion of a tool that turns the pressure adjustment screw is provided in a wall portion surrounding the mounting space.

In the vehicle air conditioning apparatus according to the first aspect, a setting of the expansion valve pressure may be performed by a tool being inserted into the unit case of the air conditioning unit, through the opening portion formed in the wall portion around the expansion valve mounting space, and turning the pressure adjustment screw of the expansion valve. Therefore, different kinds of air conditioning apparatus may be produced in accordance with specifications, even in a vehicle assembly factory rather than just an air conditioning apparatus production factory. Furthermore, transport and administration costs of the air conditioning units, storage space in the vehicle assembly factory, and the like may be reduced.

In a second aspect of the present invention, in the vehicle air conditioning apparatus according to the first aspect, the opening portion is provided at a region of the wall portion that opposes the pressure adjustment screw of the expansion valve in a mounted state thereof.

In the vehicle air conditioning apparatus according to the second aspect, the tool may be inserted through the opening portion formed at the region of the wall portion around the expansion valve mounting space that opposes the pressure adjustment screw, and turn the pressure setting screw. Therefore, ease of an operation relating to pressure adjustment of the expansion valve may be improved.

In a third aspect of the present invention, in the vehicle air conditioning apparatus according to the first or second aspect, the tool is used in combination with a pressure setting jig; and the jig is configured to be retainable at the unit case.

In the vehicle air conditioning apparatus according to the third aspect, the jig for pressure setting that is used in combination with the tool is configured to be retainable at the unit case. Therefore, the operation of turning the pressure adjustment screw of the expansion valve with the tool may be performed stably. Furthermore, the pressure setting of the expansion valve may be performed precisely.

In a fourth aspect of the present invention, in the vehicle air conditioning apparatus according to the third aspect, a retention portion capable of retaining the jig is provided at a portion of an outer face of the wall portion that is peripheral to the opening portion.

In the vehicle air conditioning apparatus according to the fourth aspect, the jig for pressure setting may be retained at the retention portion. Therefore, the operation of turning the pressure adjustment screw of the expansion valve with the tool may be performed stably. Furthermore, the pressure setting of the expansion valve may be performed precisely.

Advantageous Effects of Invention

As described hereabove, according to the vehicle air conditioning apparatus according to the first aspect of the present invention, excellent effects are provided in that different kinds of air conditioning apparatus may be easily produced in accordance with specifications thereof, even in a vehicle assembly factory rather than just an air conditioning apparatus production factory, and in that costs of transport and administration of air conditioning units and storage space in the vehicle assembly factory may be reduced.

According to the vehicle air conditioning apparatus according to the second aspect, an excellent effect is provided in that ease of the operation relating to pressure adjustment of the expansion valve may be improved.

According to the vehicle air conditioning apparatuses according to the third aspect and the fourth aspect, an excellent effect is provided in that the operation of turning the pressure adjustment screw of the expansion valve with the tool may be performed stably

DESCRIPTION OF EMBODIMENTS

Figure 1:
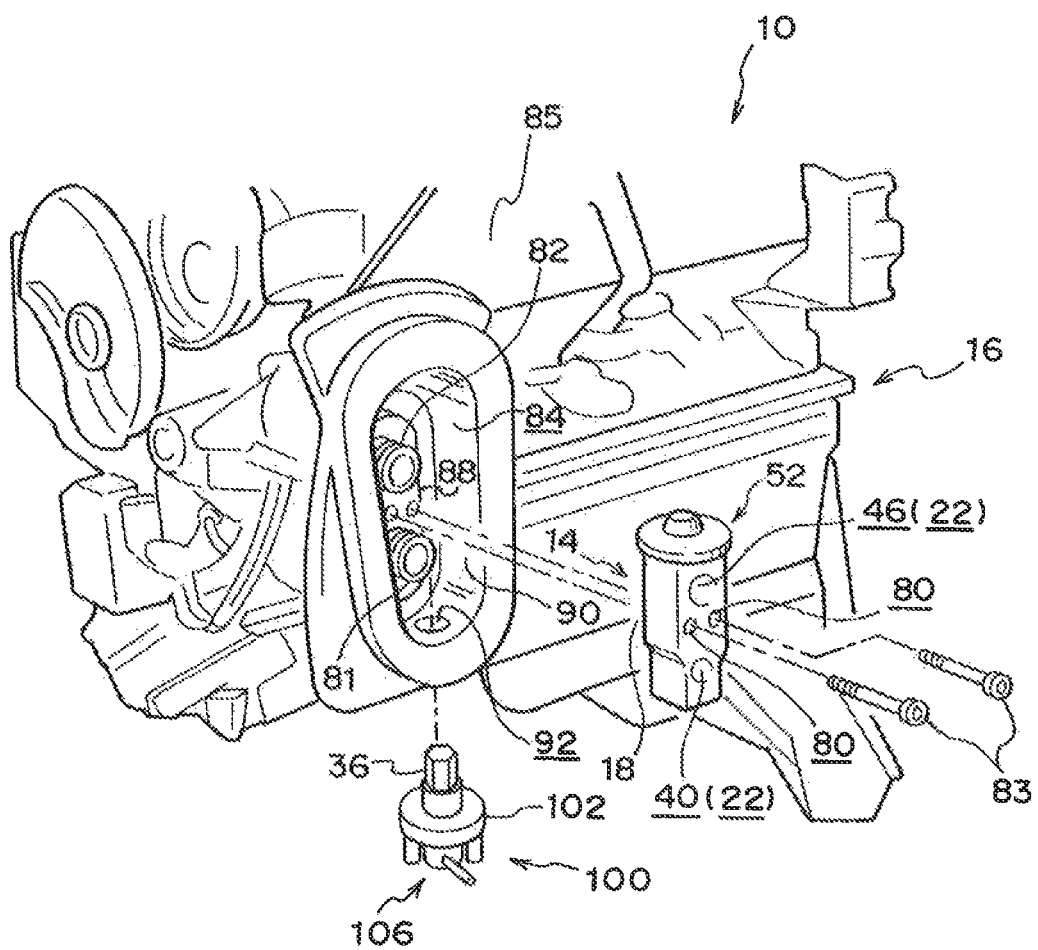
FIG. 1 is an exploded perspective view showing a vehicle air conditioning apparatus.
Figure 2:
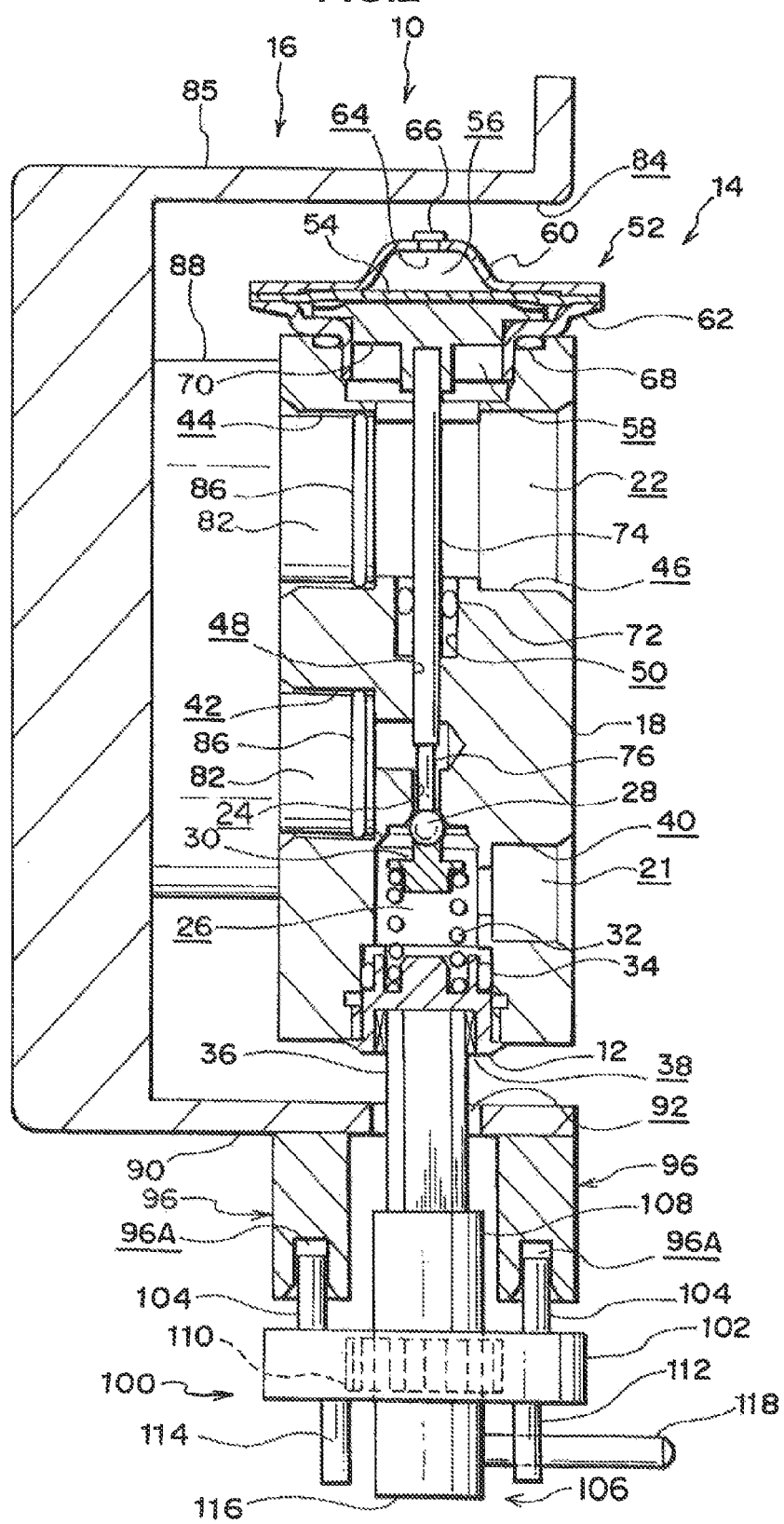
FIG. 2 is a sectional diagram showing a state in which an expansion valve is mounted at an air conditioning unit and a jig for pressure setting is retained at a unit case.

Herebelow, an exemplary embodiment of the present invention is described on the basis of the drawings. In FIG. 1 and FIG. 2, a vehicle air conditioning apparatus 10 in accordance with the present exemplary embodiment includes an expansion valve 14 with a pressure adjustment screw 12, and an air conditioning unit 16.

As illustrated in FIG. 2, a valve main body 18 of the expansion valve 14 has, for example, a substantial square rod shape. A first channel 21 and a second channel 22 are formed at the valve main body 18 so as to be separated from one another in a vertical direction. The first channel 21 is a refrigerant channel of a refrigerant cycle, from a condenser, receiver or the like (not shown in the drawings) to an evaporator (riot shown in the drawings) that is provided inside the air conditioning unit 16. The second channel 22 is a refrigerant channel of the refrigerant cycle from the evaporator to a compressor (not shown in the drawings).

An orifice 24 and a valve chamber 26 are formed on the first channel 21 in the valve main body 18. A spheroid valve body 28 is disposed at a valve seat that is provided at the upstream side of the orifice 24 in the first channel 21. The valve body 28 is a member that controls refrigerant amounts passing through the orifice 24, and is pressed and urged toward the orifice 24 by a compression coil spring 32, via a spring holder 30. The compression coil spring 32 is disposed between the spring holder 30 and the pressure adjustment screw 12. The pressure adjustment screw 12 is withdrawably threaded into the valve chamber 26 from the lower end side thereof. An O-ring 34 is provided between an inner wall of the valve chamber 26 and the pressure adjustment screw 12 in order to assure airtight sealing.

A hexagonal hole 38 is formed in the pressure adjustment screw 12 to be exposed to the outside of the valve body 28. The hexagonal hole 38 is for insertion of a tool 106, for example, a hex key 36 (see FIG. 2), when the pressure adjustment screw 12 is to be operated. The urging force of the compression coil spring 32 changes in accordance with an amount by which the pressure adjustment screw 12 is threaded in. Thus, a setting value of a pressure at which the valve body 28 opens (a level of opening of the valve body 28 from the orifice 24) may be adjusted.

An inlet port 40 and an outlet port 42 are formed at the first channel 21. The inlet port 40 is an opening portion into which refrigerant fed out from the receiver (not shown in the drawings) flows, and is in fluid communication with the valve chamber 26. The outlet port 42 is in fluid communication with the downstream side of the orifice 24, and is an opening portion through which refrigerant that has passed through the orifice 24 when the valve body 28 is open is fed out to the evaporator (not shown in the drawings) inside the air conditioning unit 16.

An inlet port 44 and an outlet port 46 are formed at the second channel 22. The inlet port 44 is an opening portion into which refrigerant vapor fed out from the evaporator inside the air conditioning unit 16 flows. The outlet port 46 is an opening portion through which the refrigerant vapor is fed out to a compressor (not shown in the drawings) of the refrigerant cycle.

A hole 48, with a small diameter, and a hole 50, with a larger diameter than the hole 48, are formed in the valve main body 18, penetrating from the second channel 22 coaxially with the orifice 24. The hole 48 and the hole 50 are for driving force to be applied to the valve body 28 to open and close the orifice 24 in accordance with an outlet temperature of the evaporator. A power element portion 52, which serves as a temperature-sensing portion, is threaded into and fixed at an upper end of the valve main body 18.

The power element portion 52 includes a diaphragm 54 made of stainless steel, an upper cover 60 and a lower cover 62. The upper cover 60 and lower cover 62 are provided to sandwich the diaphragm 54 and respectively make area contact by welds. An upper pressure operation chamber 56, which is an airtight temperature-sensing chamber, is formed between the upper cover 60 and the diaphragm 54. A predetermined diaphragm-driving fluid is sealed into the upper pressure operation chamber 56 through a hole 64 that is formed in the upper cover 60. The hole in the upper cover 60 is sealed with a plug 66.

The lower cover 62 is threaded into the valve main body 18 with a packing 68 interposed. A lower pressure operation chamber 58 is formed inside the lower cover 62 at the lower side of the diaphragm 54. The lower pressure operation chamber 58 is in fluid communication with the second channel 22. Thus, the pressure of refrigerant vapor passing through the second channel 22 acts on the lower pressure operation chamber 58.

An abutting member 70 is provided inside the lower pressure operation chamber 58. The abutting member 70 is made of for example, aluminum and abuts against a central portion of the lower face of the diaphragm 54. A temperature-sensing rod 74 made of, for example, aluminum is attached to the abutting member 70. The temperature-sensing rod 74 penetrates through the second channel 22 and extends into the hole 50 with the larger diameter and the hole 48 with the small diameter. The temperature-sensing rod 74 is slidable with respect to the hole 50, with an O-ring 72 interposed. Airtight sealing between the first channel 21 and the second channel 22 is assured by this O-ring 72. The temperature-sensing rod 74 is also slidable with respect to the hole 48 with the small diameter. An operation rod 76 is provided at the bottom end of the temperature-sensing rod 74. The operation rod 76 is formed with a smaller diameter than the orifice 24, extends into the orifice 24, and abuts against the valve body 28.

As described above, the predetermined diaphragm-driving fluid is sealed inside the upper pressure operation chamber

56. The second channel 22 and the lower pressure operation chamber 58 are in fluid communication, and the temperature of the refrigerant vapor in the second channel 22 (a refrigerant outlet temperature of the evaporator) is transferred to the lower pressure operation chamber 58. The diaphragm 54 is displaced up and down in accordance with pressure differences between the upper pressure operation chamber 56 and the lower pressure operation chamber 58. This displacement is transmitted via the abutting member 70 to the temperature-sensing rod 74, and the temperature-sensing rod 74 and the operation rod 76 move up and down. Because the operation rod 76 abuts against the valve body 28, when the operation rod 76 moves up and down, the valve body 28 moves toward and away from the valve seat at the orifice 24 against the urging force of the compression coil spring 32. Thus, flow amounts of refrigerant being supplied through the first channel 21 to the evaporator (not shown in the drawings) are controlled.

In FIG. 1, the air conditioning unit 16 is a component that accommodates the evaporator and a fan and the like (not shown in the drawings) inside a unit case 85 made of for example, synthetic resin. The air conditioning unit 16 is mounted at, for example, an instrument panel of a vehicle (not shown in the drawings). A mounting space 84 at which the expansion valve 14 is mounted is provided at the unit case 85. The mounting space 84 has, for example, an oval shape. As shown in FIG. 1 and FIG. 2, a first connection aperture 81 and a second connection aperture 82 are provided inside the mounting space 84, respectively protruding from a base portion 88. The outlet port 42 of the first channel 21 of the expansion valve 14 is connected to the first connection aperture 81, and the inlet port 44 of the second channel 22 is connected to the second connection aperture 82. Respective O-rings 86, for assuring airtight sealing when the expansion valve 14 has been mounted, are attached to an outer periphery face of the first connection aperture 81 and an outer periphery face of the second connection aperture 82.

As shown in FIG. 1, bolt holes 80 are formed at, for example, two locations in the valve main body 18 of the expansion valve 14. Respective bolts 83 are inserted into the bolt holes 80, and are fastened to, for example, the base portion 88 of the mounting space 84. Thus, the expansion valve 14 is fixed to the air conditioning unit 16.

An opening portion 92 in, for example, a circular shape is formed in a wall portion 90 of the unit case 85 that surrounds the mounting space 84. The opening portion 92 is for insertion of the tool 106 (the hex key 36) that turns the pressure adjustment screw 12. The opening portion 92 is provided at a region of the wall portion 90 that opposes the pressure adjustment screw 12 of the expansion valve 14 in the mounted state. Specifically, as shown in FIG. 2, the opening portion 92 is provided at a region opposing the hexagonal hole 38 of the pressure adjustment screw 12.

Figure 3:
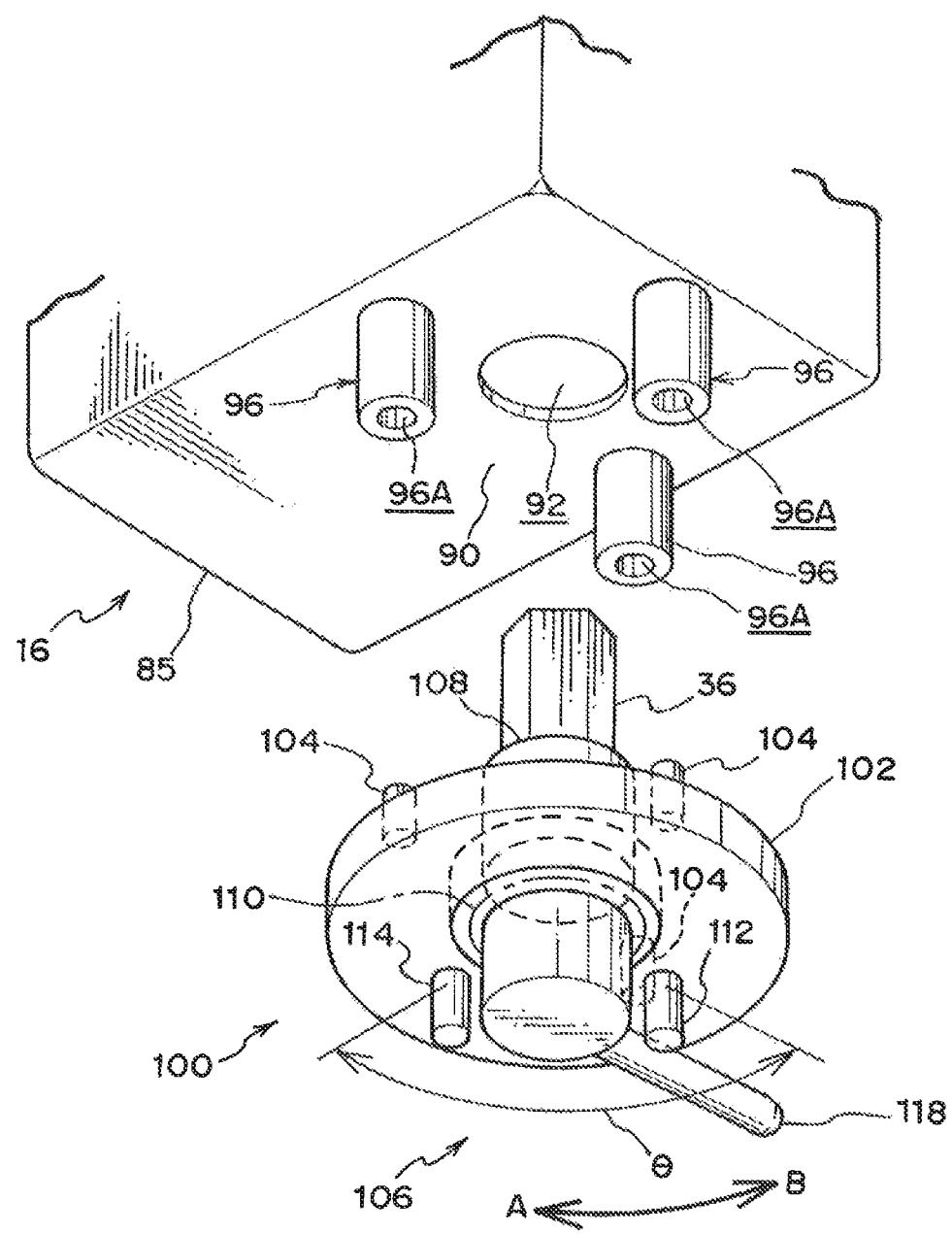
FIG. 3 is a perspective view showing an opening portion and retention portions of a wall portion of the unit case, and the jig for pressure setting.

The tool 106 is used in combination with a jig 100 for pressure setting, which is described below The jig 100 is configured to be retainable at the unit case 85. Specifically, as shown in FIG. 2 and FIG. 3, retention portions 96 that are capable of retaining the jig 100 are provided at the a portion of outer face of the wall portion 90 that is peripheral to the opening portion 92. The retention portions 96 are, for example, circular rod-shaped protrusions disposed uniformly at three locations around the opening portion 92. As shown in FIG. 2, fitting holes 96A are formed in end portions of the retention portions 96. Portions of the jig 100 are inserted into and fitted the fitting holes 96A.

—Jig for Pressure Setting—

The pressure setting value of the expansion valve 14 according to the present exemplary embodiment is altered as appropriate after the mounting of the expansion valve 14 to the air conditioning unit 16, in accordance with specifications of the vehicle air conditioning apparatus 10 depending on the model of vehicle. The jig 100 as illustrated in FIG. 1 to FIG. 3 is used in order that an alteration of the setting value may be performed accurately and easily even in a vehicle assembly factory.

In FIG. 2 and FIG. 3, the jig 100 includes, as an example, a circular plate-shaped base portion 102, pins 104 and the tool 106. The pins 104 are provided at one face of the base portion 102 and are inserted into and fitted into the fitting holes 96A of the retention portions 96. The tool 106 is inserted into the base portion 102 and is supported to be turnable relative to the base portion 102.

Three of the pins 104 are provided, corresponding with the positions of the retention portions 96 provided at the unit case 85. Diameters of the pins 104 are set to be slightly larger than diameters of the fitting holes 96A of the retention portions 96. Thus, the pins 104 may be inserted into and fitted into the fitting holes 96A.

Stoppers 112 and 114 at two locations are provided at the other face of the base portion 102 (the face at the opposite side from the face at which the pins 104 are provided). The stoppers 112 and 114 regulate an angle of turning of the pressure adjustment screw 12 of the expansion valve 14. An angle $\theta$ formed between the stoppers 112 and 114 corresponds with a turning angle of the tool 106, and thus a turning angle of the pressure adjustment screw 12.

In FIG. 2, the tool 106 includes the hex key 36, a circular rod-shaped retention member 108 and a handle shaft 116. The hex key 36 corresponds with the hexagonal hole 38 of the pressure adjustment screw 12. The retention member 108 retains the hex key 36. The handle shaft 116 is coaxially connected to the retention member 108 via a serration 110. A handle portion 118 that protrudes to the radial direction outer side of the handle shaft 116 is provided at an outer periphery face of the handle shaft 116.

The retention member 108 and handle shaft 116 of the tool 106 are each inserted into the base portion 102, and engaged with the base portion 102 via the serration 110. Specifically, the handle shaft 116 is inserted into the base portion 102 from the side at which the stoppers 112 and 114 are disposed such that the handle portion 118 is disposed between the two locations of the stoppers 112 and 114 (within the range of the angle $\theta$). Hence, the handle portion 118 of the tool 106 is turnable within the range of the angle $\theta$ formed between the two locations of the stoppers 112 and 114.

The configuration of the jig 100 is not limited to the illustrated example. The jig 100 is an example of a structure that is retainable at the unit case 85. A structure in which the retention portions 96 are provided at the unit case 85 and the pins 104 of the jig 100 are inserted into and fitted into the fitting holes 96A of the retention portions 96 has been mentioned, but a structure by which the jig 100 is retainable at the unit case 85 is not limited thus. Provided the jig 100 can be temporarily retained at the unit case 85 when the jig 100 is being employed, any structure may be used. For example, retention portions with fitting holes may be provided at the jig 100, and pins provided at the unit case 85 may be inserted into and fitted into these fitting holes (not shown in the drawings). Further, magnetic bodies may be disposed at one of the unit case 85 and the jig 100 and magnets disposed at the other, and the jig 100 may be retained at the unit case 85 by magnetic attraction (not shown in the drawings).

—Operation—

The present exemplary embodiment is constituted as described above, and operations thereof are described below.

As in FIG. 1, in the vehicle air conditioning apparatus 10 according to the present embodiment, the expansion valve 14 is mounted to the air conditioning unit 16, and then the setting value of the expansion valve 14 is altered in accordance with specifications.

The mounting of the expansion valve 14 to the air conditioning unit 16 is described. In the present embodiment, the expansion valve 14 that is used is selected such that a characteristic of setting pressure alterations with respect to turning angles of the pressure adjustment screw 12 of the expansion valve 14 has no irregularities. The pressure setting value of the expansion valve 14 is set to a certain initial value when the expansion valve 14 is shipped from a factory in which it is fabricated, if the pressure setting value according to a specification is different from the initial value, the angle θ between the stoppers 112 and 114 of the jig 100 (see FIG. 3) is set so as to equal a turning angle of the pressure adjustment screw 12 that corresponds to this difference in pressure.

As shown in FIG. 1, the expansion valve 14 is mounted to the mounting space 84 of the air conditioning unit 16. Specifically, as shown in FIG. 2, the outlet port 42 of the first channel 21 is connected to the first connection aperture 81 and the inlet port 44 of the second channel 22 is connected to the second connection aperture 82. Thus, the expansion valve 14 is connected to the air conditioning unit 16. Then, as shown in FIG. 1, the two bolts 83 are inserted into the two bolt holes 80 in the valve main body 18 of the expansion valve 14 and fastened to the base portion 88. Thus, the expansion valve 14 is fixed to the air conditioning unit 16.

Next, As in FIG. 2 and FIG. 3, the jig 100 is retained at the unit case 85. Specifically, the hex key 36 of the tool 106 is engaged with the hexagonal hole 38 of the pressure adjustment screw 12, while the pins 104 of the jig 100 are inserted into and fitted into the fitting holes 96A of the retention portions 96 provided at the unit case 85. Thus, the jig 100 is retained at the unit case 85.

Now, if a pressure setting value of the expansion valve 14 according to a vehicle's specifications is larger than the initial setting value, the pressure adjustment screw 12 needs to be turned to the right and the compression coil spring 32 in the expansion valve 14 (FIG. 2) compressed, Accordingly, while the jig 100 is retained at the unit case 85, the handle portion 118 of the tool 106 is made to abut against the stopper 112, at a turn starting end side. At the same time, a position of meshing with the serration 110 is selected such that the hex key 36 of the tool 106 engages with the hexagonal hole 38 without turning the pressure adjustment screw 12.

Then, as shown in FIG. 3, the tool 106 is turned through the angle θ until the handle portion 118 abuts against the stopper 114, at a turn finishing end side. Thus, the pressure setting value of the expansion valve 14 may be altered to a desired value. Because the tool 106 is turned in the state in which the jig 100 is retained by the retention portions 96, the pressure setting of the expansion valve 14 may be performed easily and stably after the mounting at the air conditioning unit 16. Furthermore, the pressure setting of the expansion valve 14 may be performed accurately. The expansion valve 14 subsequent to the setting change may be distinguished from the expansion valve 14 in the initial state by being marked.

Because the tool 106 is attachable to and detachable from the base portion 102, respective base portions 102 with different angles θ between the stoppers 112 and 114 may be prepared to be used in accordance with various specifications, and different pressure settings may be made using the same tool 106.

Conversely, if the setting value after the alteration is to be smaller than the initial setting value, the pressure adjustment screw 12 is to be turned to the left. Therefore, the turn starting end side is at the stopper 114 and the turn finishing end side is at the stopper 112. Alternatively, if the initial setting value of the expansion valve 14 is equal to the specifications of the vehicle air conditioning apparatus 10, there is no need to alter the pressure setting with the jig 100.

As described hereabove, with the present embodiment, a setting of pressure of the expansion valve 14 may be performed at the unit case 85 of the air conditioning unit 16 by the tool 106 being inserted through the opening portion 92, which is formed at the region of the wall portion 90 of the mounting space 84 of the expansion valve 14 that opposes the pressure adjustment screw 12, and turning the pressure adjustment screw 12. Therefore, ease of operations relating to pressure adjustment of the expansion valve 14 may be improved. Further, different kinds of the vehicle air conditioning apparatus 10 may be easily produced in accordance with specifications, even in a vehicle assembly factory rather than just a factory for production of the vehicle air conditioning apparatus 10. Consequently, transport and administration costs of the air conditioning unit 16, storage space in the vehicle assembly factory, and the like may be reduced.

Explanation of Reference Numerals
10 Vehicle air conditioning apparatus
12 Pressure adjustment screw
14 Expansion valve
16 Air conditioning unit
36 Hex key (tool)
84 Mounting space
85 Unit ease
90 Wall portion
92 Opening portion
100 Jig
96 Retention portions
106 Tool

The invention claimed is:

1. An air conditioning apparatus for a vehicle, comprising:
an expansion valve with a pressure adjustment screw;
a tool configured to turn the pressure adjustment screw;
an air conditioning unit including a unit case, the unit case including:
   a mounting space at which the expansion valve is mounted, and
   an opening portion provided in a wall portion surrounding the mounting space, and
a pressure setting jig having at least one protrusion, the pressure setting jig configured to be used in combination with the tool to turn the pressure adjustment screw when the tool is inserted in the opening portion;
a retention portion having at least one fitting hole for engagement with the at least one protrusion, wherein the retention portion is provided at a portion of an outer face of the wall portion that is peripheral to the opening portion; and
wherein the pressure setting jig is retained at the unit case.

2. The air conditioning apparatus for a vehicle of claim 1, wherein the pressure setting jig is retained at the unit case when the pressure adjustment screw is turned by the tool.

* * * * *